United States Patent [19]
Brucker

[11] 3,733,663
[45] May 22, 1973

[54] CORNER SHAPING TOOL
[75] Inventor: William S. Brucker, Towson, Md.
[73] Assignee: The Black and Decker Manufacturing Company, Towson, Md.
[22] Filed: May 12, 1971
[21] Appl. No.: 142,675

[52] U.S. Cl.................29/78 R, 29/79 R, 29/103 R, 144/134 D, 144/236 R
[51] Int. Cl. ......B23d 71/00, B26d 1/12, B27g 13/00
[58] Field of Search................29/78, 79, 103, 103 A, 29/104; 144/218, 134, 134 D, 236, 240

[56] References Cited

UNITED STATES PATENTS

| | | | |
|---|---|---|---|
| 331,771 | 12/1885 | Corson | 144/236 X |
| 1,630,173 | 5/1927 | Dumout | 144/218 |
| 3,212,541 | 10/1965 | Burrows et al. | 144/134 D |
| 3,287,716 | 12/1966 | Dutot | 144/134 D |
| 2,589,458 | 3/1952 | Toussant | 144/134 D |
| 1,433,497 | 10/1922 | Carter | 144/134 D |

*Primary Examiner*—Harrison L. Hinson
*Attorney*—Leonard Bloom, Joseph R. Slotnik and Edward D. Murphy

[57] ABSTRACT

A rotary tool for corner shaping wood and other materials and adapted for use as an attachment for a portable power drill. The tool comprises a rasp or toothed cutter assembly mounted on a spindle and rotatable therewith between two guides. The guides are free to rotate about the spindle and roll along the workpiece as the shaping operation progresses. The surface of the cutter assembly is contoured complimentary to that desired on the workpiece corner. The cutter assembly may include one suitably shaped cutter, or it may include a plurality of cutters, and the spindle assembly is constructed to readily accommodate one or more cutters, so that a number of different shaped corners can be produced.

2 Claims, 8 Drawing Figures

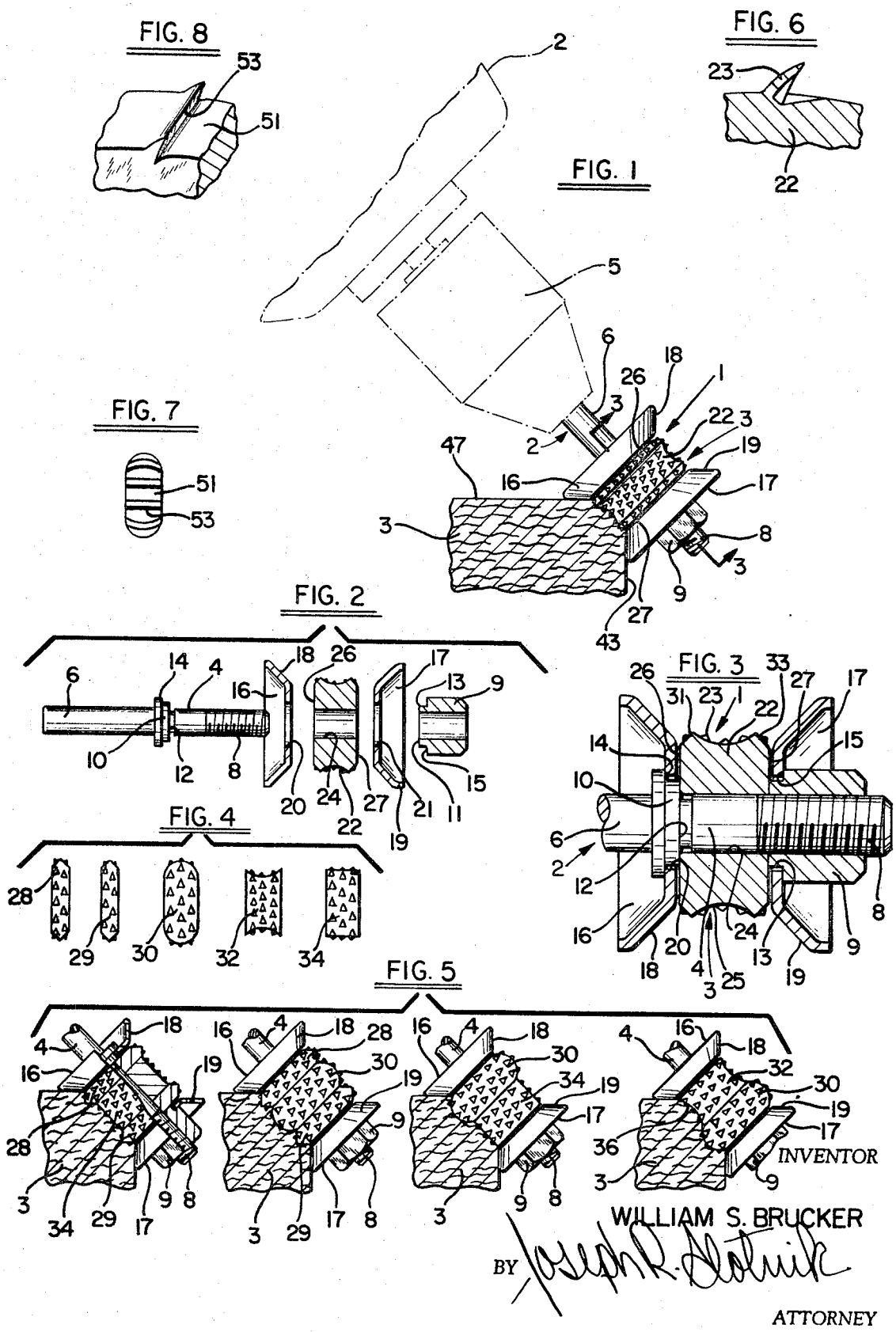

3,733,663

CORNER SHAPING TOOL

BACKGROUND OF THE INVENTION

This invention relates to a rotary tool adapted for use as an attachment for a portable power drill and will produce a finished, contoured corner on a workpiece. The invention eliminates the need for expensive equipment such as jigs and fixtures and, since it is usable as a drill attachment and does not require expensive, high speed equipment such as a router, it generates great appeal, particularly for the more casual user.

SUMMARY OF THE INVENTION

A main object of the present invention, therefore, is to provide a rotary tool that will produce a finished corner on a wood or other workpiece with a minimum in equipment and expense, and operator experience required.

Further important objects are to provide a rotary tool which incorporates guides and one or more cutters in a simple sandwiched assembly and is readily disassembled for the addition, removal and/or replacement of various cutters for producing work-piece corners of various contours.

A further important object of the invention is to provide a rotary tool that is adapted for relatively safe operation, since the operation is within the relatively low speed range of a portable powered drill.

Still further important objects of the invention are to provide a rotary corner shaping tool of the above character which is readily adaptable for use on workpiece corners regardless of their inclination, i.e. horizontal, vertical, or otherwise; their disposition, i.e. top, side, or undersurface; whether they are straight or curved; and whether the workpiece is in place, held in a fixture, or otherwise.

Yet another object of the invention to be specifically enumerated herein is to provide a rotary shaping cutter having teeth formed in the face thereof by staking to provide a shaping cutter adaptable for use at relatively low rotational speeds of a portable power drill.

Further objects are to provide a corner shaping tool which is relatively inexpensive to manufacture, rugged in construction, and reliable in use.

BRIEF DESCRIPTION OF THE DRAWING

FIG. 1 is an elevation of a rotary, corner shaping tool embodying a preferred form of the present invention shown as a drill attachment and in engagement with the edge of a workpiece;

FIG. 2 is an exploded view, partly in section and partly in elevation, of the rotary tool of FIG. 1;

FIG. 3 is an enlarged sectional view of FIG. 1 taken along the line 3—3 thereof;

FIG. 4 is an elevation illustrating a number of differently contoured cutters which may be used separately or selectively together, to form a variety of contoured edges;

FIG. 5 is a series of elevations showing various combinations of the cutters of FIG. 4;

FIG. 6 is an enlarged sectional view illustrating a tooth of a cutter of FIGS. 1-5;

FIG. 7 is an elevation of a modified form of rotary cutter of the present invention; and FIG. 8 is an enlarged partial perspective of FIG. 7.

DETAILED DESCRIPTION

Referring now more specifically to the drawings, a rotary corner shaping tool, embodying the present invention, is illustrated generally at 1 in FIGS. 1 and 3, and is seen to include a spindle assembly 2, a cutter assembly 3, and guides 16, 17. The spindle assembly 2 includes a spindle 4 having a shank 6 adapted for insertion into and retention by a drill chuck 5 of a portable power drill 12. The cutter assembly 3 includes a shaped rotary cutter 22 disposed on the spindle 4 and is flanked by the circular guides 16, 17. A retaining nut 9, forming part of the spindle assembly 2, is threaded on an outer threaded end 8 of the spindle 4 and holds the cutter 22 and the guides 16, 17 in place thereon.

Turning now to FIGS. 2 and 3, it is seen that the cutter 22 has a central bore 24 slideably fitted over the spindle 4. The cutter 22 has a radial end face 26 positioned to engage a radial shoulder 12 on the spindle 4 and is held tightly thereagainst by the retaining nut 9 which engages another radial end face 27 on the cutter 22. The circular guide 16 has a central opening 20 loosely surrounding a radial flange 10 formed on the spindle 4 and is axially trapped between a radial shoulder 14 on the spindle 4 and the end face 26 on the cutter 22. In similar fashion, the circular guide 17 has a central opening 21 loosely surrounding a reduced diameter annular surface 13 on the retaining nut 9 and is axially trapped between a radial shoulder 15 on the nut 9 and the end face 27 on the cutter 22. Importantly, the diameter of the openings 20, 21 in the circular guides 16, 17 is larger than the diameter of the annular surfaces 10, 13, respectively, and the wall thickness of the guides 16, 17, adjacent the openings 20, 21, is less than the axial dimension of the annular surfaces 10, 13, respectively, so that when the parts are assembled, as shown in FIG. 3, the nut 9 securely clamps the cutter 22 for rotation with the spindle 4, while the circular guides 16, 17 are freely rotatable relative thereto.

The circular guides 16, 17 are provided with conical bearing flanges 18, 19, respectively, each of which forms an angle of 45° with the axis of the spindle 4. The bearing flanges 18, 19, therefore, form an included angle of 90° and are adapted to rollingly engage perpendicular faces 41, 43, respectively, of a workpiece 3, while the rotary cutter 22 engages the corner of the workpiece 13, formed by the intersecting surfaces 23, 24. The guides 16, 17, therefore, accurately locate the rotary cutter 22 with respect to the workpiece corner to be shaped and, by virtue of their free rotative disposition on the spindle 4, will not mar the workpiece surfaces 23, 24 as the cutting tool 22 moves along and shapes the corner of the workpiece.

The cutter 22 shown in FIGS. 1-3 and 6 is a solid metal body having a plurality of rasp or file-like teeth 23 about its periphery. The teeth 23 are formed by staking the cutter body and are struck upwardly therefrom and each presents a generally inverted V-shaped chisel edge facing in the direction of rotation of the cutter 22. The teeth 23 are spaced from one another sufficiently to allow discharge of the particles of material removed from the workpiece corner during use. In addition, the teeth 23 may be staggered axially along the cutter 22 to more evenly distribute resistance drag thereon during use.

The cutter 22 illustrated in FIGS. 1-3 has a specific profile which includes a concave central portion 25 and inwardly tapered conical outer edges 31, 33. This cutter 22 will produce a profile shape along the workpiece corner which is generally complimentary to its shape, that is, a central convex portion and outwardly tapered, conical edges. In accordance with a feature of the invention, a cutter assembly including one or more cutters having a variety of shapes may be substituted for the particular cutter 22, depending upon the profile configuration desired along the workpiece corner. A collection of shaped cutters 28, 29, 30, 32, 34, seen in FIG. 4 and each of which has staked, rasp-like teeth 23 formed thereon, illustrates a few of the types which may be used. Each of these cutters can be used alone, or, if desired, two or more can be used together, as shown in FIG. 5, to produce a complex contoured, highly decorative shaped corner along a workpiece.

As described above for the embodiment of FIGS. 1–3, the nut 9 bears against the outer end face 27 of the cutter 22 and clamps its inner end face 26 against shoulder 12 on the spindle 4. When two or more cutters are used together, as shown in FIG. 5, nut 9 bears against the outer end face of the outermost cutter and clamps the inner end face of the innermost cutter against shoulder 12. In both cases circular guides 16, 17 are axially trapped but freely rotate between the innermost cutter end face and shoulder 14, and the outermost cutter end face and shoulder 15, respectively, regardless of the number of cutters employed. It is only necessary that the spindle 4 and its screw threaded portion 8 be of a length to allow the nut 9 to be threaded thereon and clamp the cutter or cutters against the shoulder 12 for all desirable numbers and combinations of cutters. It will be appreciated that the cutters 28, 29, 30, 32, 34 shown in FIG. 4 together with others if desired, may form a kit with which even the casual user may shape workpiece corners in a variety of decorative profiles.

FIGS. 7 and 8 illustrate a modified form of cutter tooth configuration. This cutter 51 is shown constructed from a solid metal body and has a plurality of axial teeth 53 formed thereon. These teeth 53, like the teeth 23, are struck upwardly from the cutter 51 by staking the cutter body. The teeth 53 define chisel-like edges 55 which face in the direction of rotation of the cutter 51.

In use, the cutter or cutters to be used are assembled to the spindle 4, with the cutter teeth facing in the direction of spindle rotation, after the circular guide 15 is positioned thereon. Thereafter, guide 17 is positioned on the nut 9 and the latter is threaded on portion 8 of the spindle 4 into clamping engagement with the cutter or cutters. The shank 6 of the spindle 4 is then secured in the drill chuck 5 and the device is ready to use.

The operator then turns the drill on and the cutter or cutters are brought lightly into contact with the workpiece corner to be shaped. As the cutter descends into the workpiece corner, guide flanges 18, 19 contact the faces 41, 43 of the workpiece. The operator then moves the unit along the workpiece corner with the guide flanges 18, 19 engaging the faces 41, 43 until the entire workpiece corner is shaped.

It will be appreciated that since the tool 1 is adapted for attachment to a portable drill, this tool may be used to shape corners of workpieces mounted in a jig or fixture, or corners of stationarily mounted workpieces whether the corners are horizontal, vertical or otherwise, or top, side or undersurface corners on various workpieces, and can even be used to shape non-straight workpiece corners.

Further, it will be appreciated that the invention is not limited to corners formed at perpendicular or flat faces of workpieces, and that the guide flanges 18, 19 can be modified accordingly to properly engage and guide the tool 1 along the workpiece corner by proper engagement with the workpiece surfaces adjacent the portion thereof to be shaped.

Still further, the adaptation of this tool 1 as an attachment for a drill renders it convenient and useful to even the most casual user. No expensive machinery (e.g. a router) is needed to power the tool 1, and no complicated or expensive jigs or fixtures are required since the workpiece can be mounted in a simple vise, or it can be shaped in place if desired.

Finally, the tool 1 of this invention is very versatile in that by combining various cutter shapes, such as those shown in FIG. 4, various highly decorative contours, including a cove, corner round, a chamfer, as well as designs including the ogee and roman ogee seen in FIG. 5, can be achieved.

Some changes may be made in the construction and arrangement of my rotary cutter attachment without departing from the real spirit and purpose of my invention, and it is my intention to cover by my claims any modified forms or structure or mechanical equivalents which may be reasonably included within their scope.

I claim:

1. A rotary tool for shaping the edge of a workpiece of wood and other materials comprising:
   a. a one-piece spindle having one end adapted to be received by a drill chuck and its other end being externally threaded;
   b. stepped abutment means on said spindle intermediate its ends;
   c. rotary cutter means including at least one cutter body having staked teeth defining axially and arcuately spaced cutting edges, said cutter means being slidably received on said spindle and engageable with one of said abutment steps;
   d. a one-piece shouldered nut threaded on said other spindle end and pressing said cutter means against said one abutment step;
   e. a first circular guide adapted to engage a face of said workpiece at one side of said edge and axially trapped between another of said abutment steps and said cutter means;
   f. a second circular guide adapted to engage another face of said workpiece at another side of said edge and axially trapped between said shoulder on said nut and said cutter means;
   g. said first and second circular guides being freely rotatable relative to said spindle and said cutter means and adapted to guide said cutter means along said edge.

2. A tool as defined in claim 1 wherein:
   e. said cutter means may include one or more different cutters having preselected surface profiles;
   f. said nut adjustably accommodating said different cutters.

* * * * *

UNITED STATES PATENT OFFICE
CERTIFICATE OF CORRECTION

Patent No. 3,733,663     Dated May 22, 1973

Inventor(s) William S. Brucker

It is certified that error appears in the above-identified patent and that said Letters Patent are hereby corrected as shown below:

Column 2, line 10, the numeral "12" should be - -7- -; line 45, the numeral "3" should be - -11- -; line 47, the numeral "13" should be - -11- -; line 47, the numeral "23" should be - -41- -; line 48, the numeral "24" should be - -43- -; line 52, the numerals "23, 24" should be - -41,43- -.

In the drawings, the numeral "2" in the upper portion of Fig. 1 should be - -7- -; the numerals "3" and "47" in the lower left side of Fig. 1 should be - -11 and 41- -, respectively; the numeral "3" in Fig. 5 (four occurrences) should be - -11- -; the numeral "55" should be added to Figs. 7 and 8 indicating the edges of teeth 53.

Signed and sealed this 18th day of December 1973.

(SEAL)
Attest:

EDWARD M. FLETCHER, JR.
Attesting Officer

RENE D. TEGTMEYER
Acting Commissioner of Patents